(12) United States Patent
Andrews

(10) Patent No.: US 6,350,172 B1
(45) Date of Patent: Feb. 26, 2002

(54) RECONFIGURABLE TOY CYCLE

(75) Inventor: Michael Andrews, Los Angeles, CA (US)

(73) Assignee: Mattel, Inc., El Segundo ( * ) Notice: Subject to any disclaimer, the term of this patent is extended or adjusted under 35 U.S.C. 154(b) by 0 days.

(21) Appl. No.: 09/632,117

(22) Filed: Aug. 3, 2000

(51) Int. Cl.[7] .................. A63H 17/16; A63H 17/00; A63H 35/00

(52) U.S. Cl. .................. 446/440; 446/435; 446/487

(58) Field of Search .................. 446/440, 429, 446/430, 435, 465, 470, 471, 487, 489

(56) References Cited

U.S. PATENT DOCUMENTS

| | | | |
|---|---|---|---|
| 1,721,704 A | * 7/1929 | Madaschi | 446/429 |
| 4,382,347 A | 5/1983 | Murakami | |
| 4,529,391 A | * 7/1985 | Hoshino et al. | 446/440 |
| 4,571,203 A | * 2/1986 | Murakami | 446/440 |
| 4,580,993 A | 4/1986 | Ohno | |
| 4,599,078 A | * 7/1986 | Obara | 446/487 |
| 4,674,990 A | 6/1987 | Ohno | |
| 4,680,018 A | 7/1987 | Ohno | |
| 4,689,034 A | 8/1987 | Dubois et al. | |
| 4,710,146 A | 12/1987 | Rasmussen et al. | |
| 4,750,895 A | 6/1988 | Shinohara et al. | |
| 6,086,446 A | * 7/2000 | Arriola | 446/487 X |

* cited by examiner

Primary Examiner—D. Neal Muir
(74) Attorney, Agent, or Firm—Roy A. Ekstrand

(57) ABSTRACT

A toy cycle includes a frame supporting a seat and a front fork assembly. The front fork assembly is pivotally secured to the frame and is movable between a first position and an alternate raised position. The front and rear wheels are removable and the front fork assembly is pivoted upwardly to a missile launch configuration. The cycle includes a removable handlebar assembly which is separated from the front fork assembly and fitted within an aperture formed at the lower end of the cycle frame. With the wheels removed and the handlebar assembly repositioned, and with the front fork assembly raised to the missile launch configuration, a pair of simulated rockets are assembled upon the front fork assembly and are able to be launched by a spring launch mechanism within the front fork assembly.

3 Claims, 4 Drawing Sheets

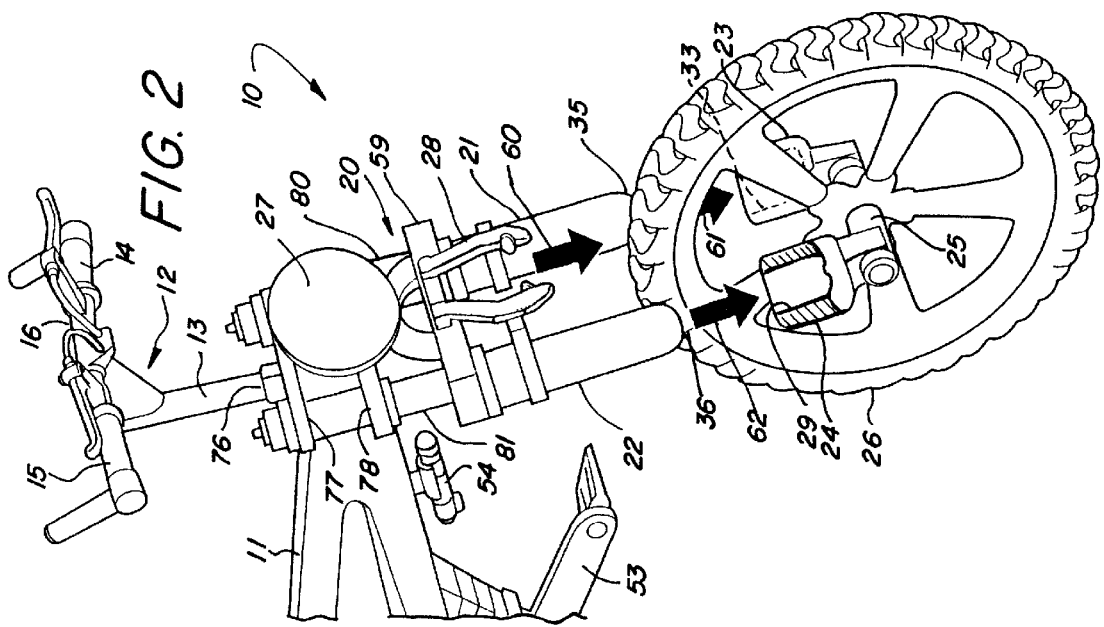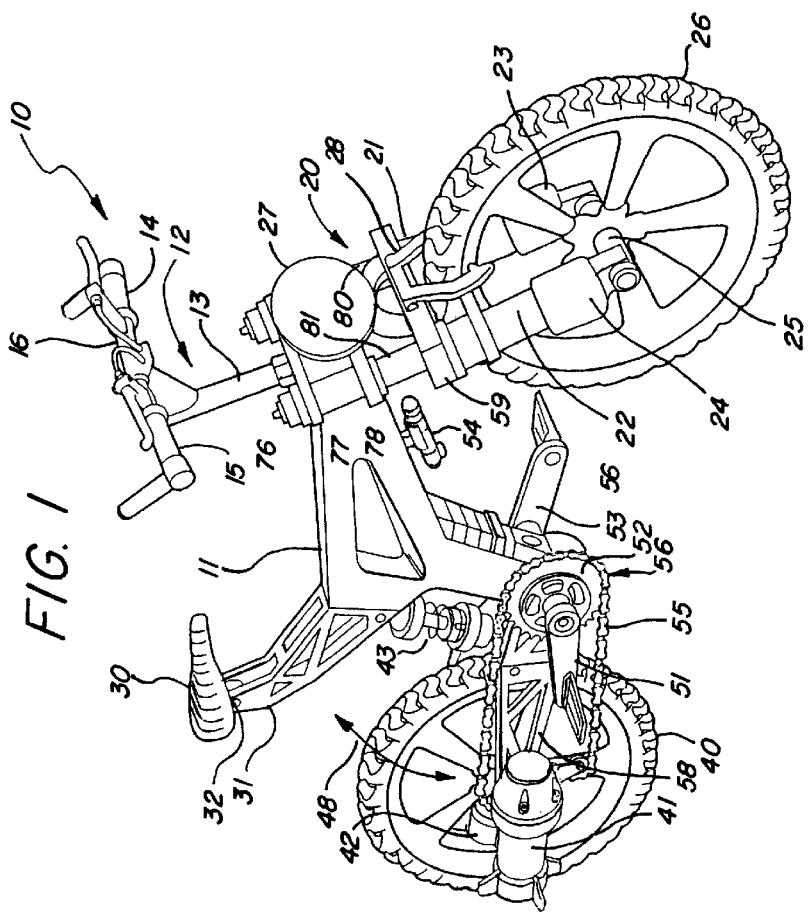

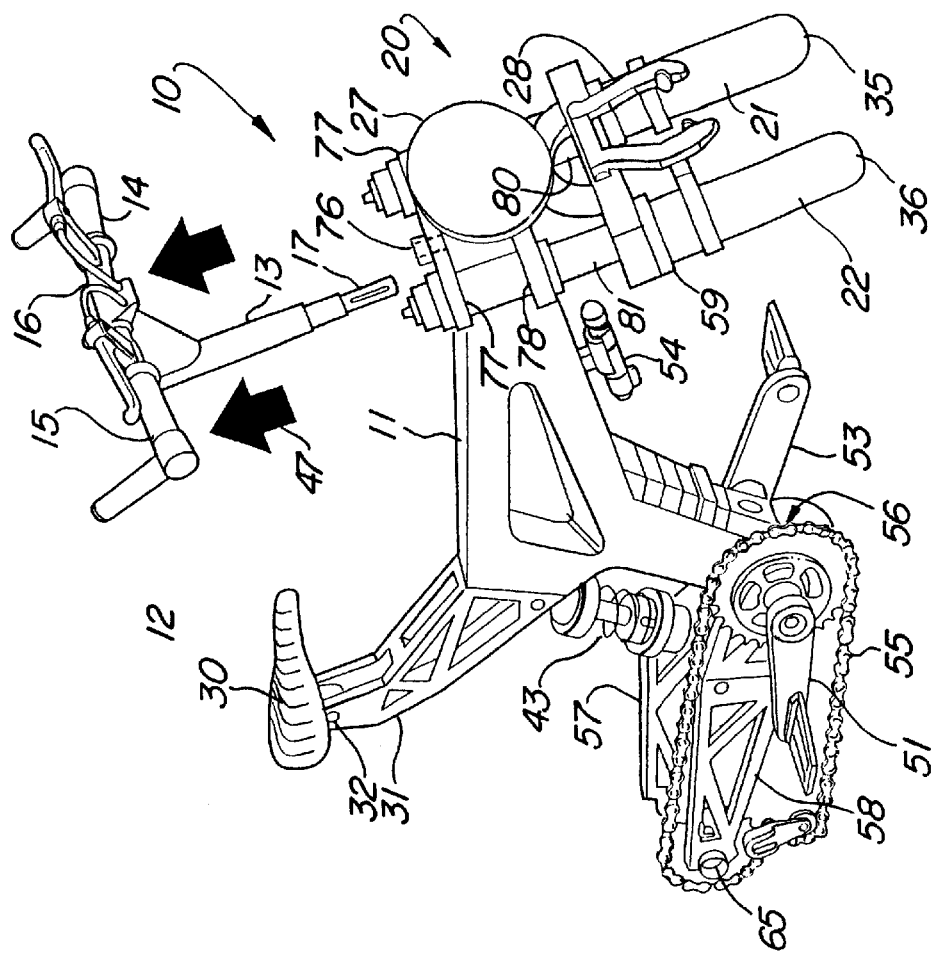
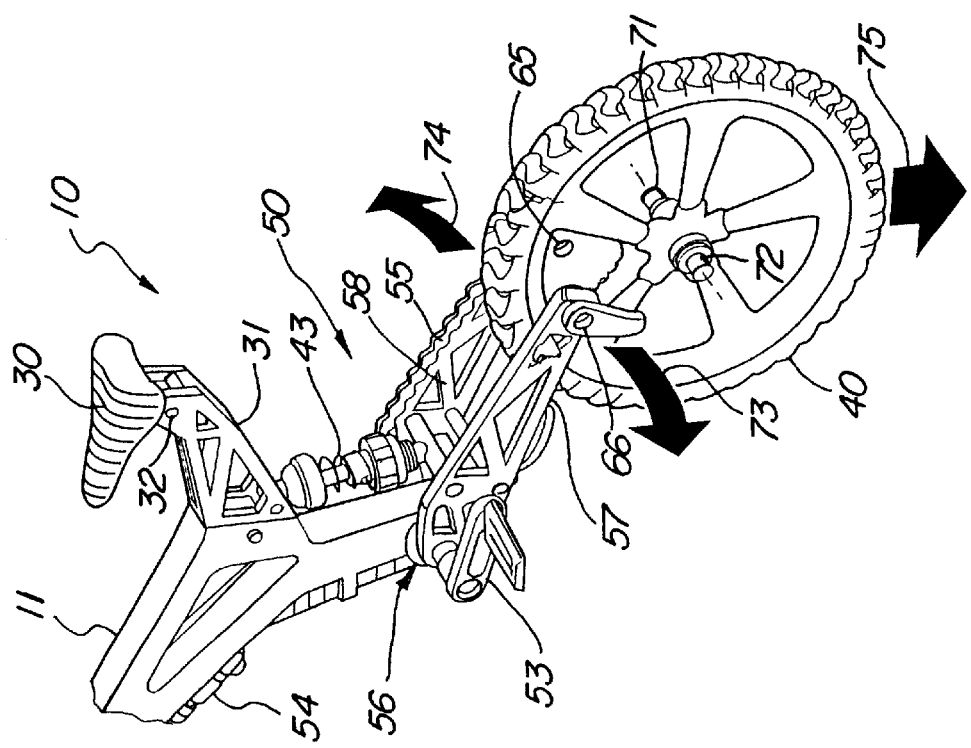

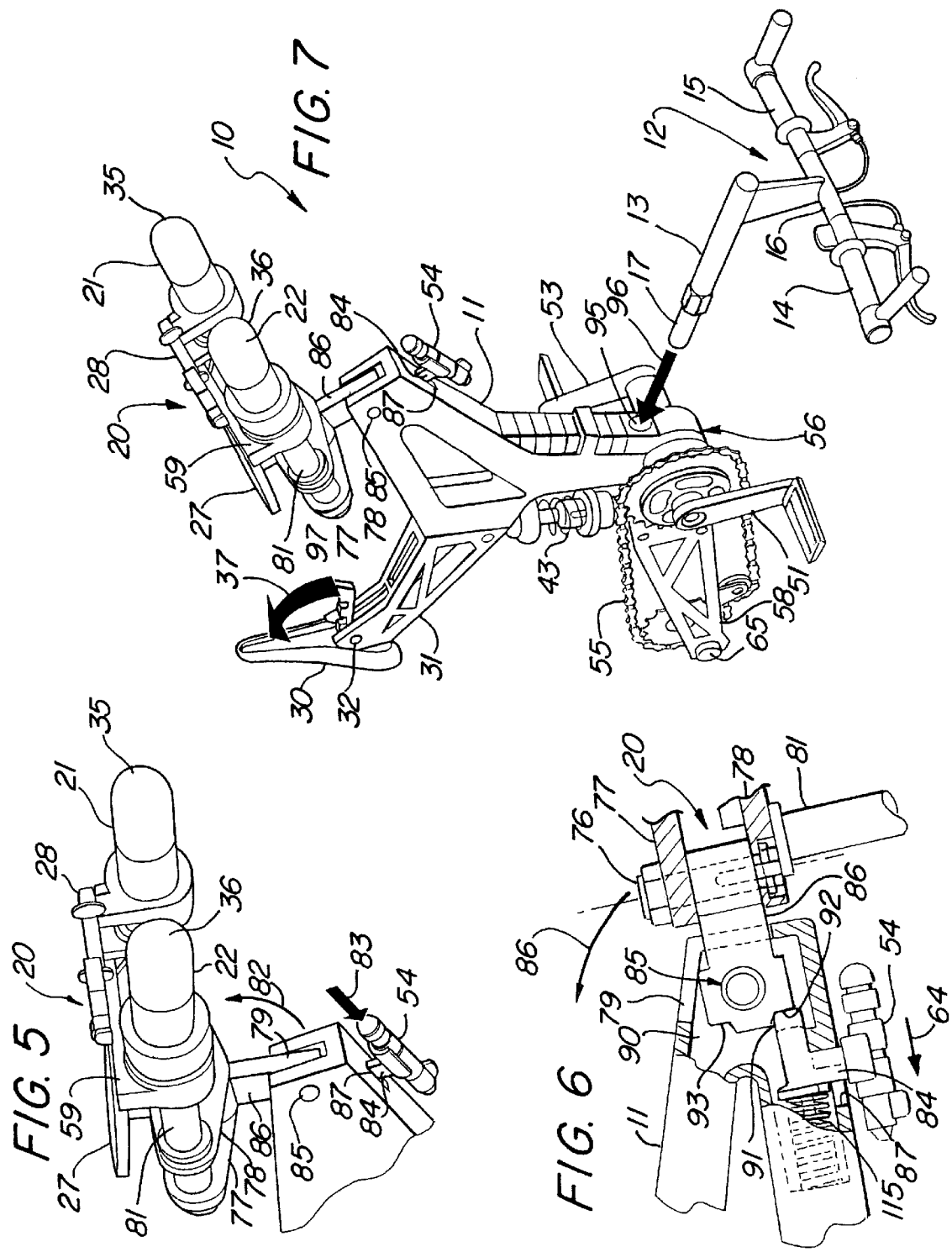

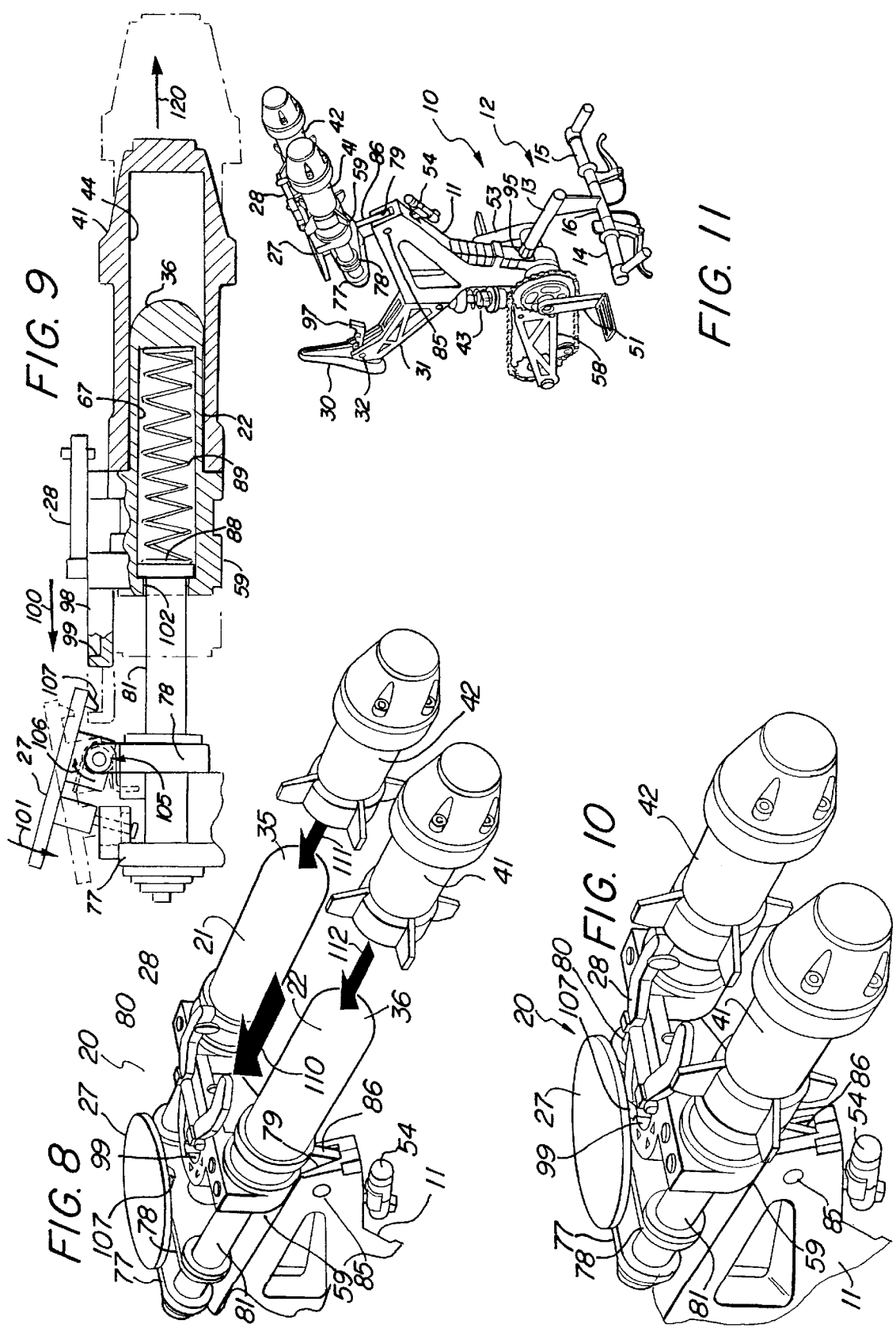

RECONFIGURABLE TOY CYCLE

FIELD OF THE INVENTION

This invention relates generally to reconfigurable toys and particularly to those which are configurable between a non-weapon type of apparatus and a weapon bearing apparatus.

BACKGROUND OF THE INVENTION

Reconfigurable toys, which are also referred to as "transformable" toys are well known in the art. Basically, reconfigurable or transformable toys derive their names from their ability to change configurations and in so doing "transform" between different toy species.

Such reconfigurable or transformable toys are typically made from molded plastic components usually interconnected and articulated by a plurality of joints and hinges. In many instances, the appearances of such reconfigurable or transformable toys are exaggerated in their substantial detail and in their relative portions often assuming a fanciful appearance.

In response to the substantial popularity of reconfigurable to transformable toys, practitioner's in the art have provided a virtually endless variety of toys. Thus, reconfigurable or transformable toys have included different types of robots, vehicle, weapons, structures, construction apparatus and fanciful apparatus. For example, U.S. Pat. No. 4,599,078 issued to Obara sets forth a TRANSFORMABLE TOY ASSEMBLY having a plurality of assembly elements which are separable and combinable with respect to each other and independently reversibly transformable between at least two forms which differ from each other. The assembly elements are combined to provide a robot in one configuration and a heavy material truck and tractor in an alternate configuration.

U.S. Pat. No. 4,674,990 issued to Ohno sets forth a RECONFIGURABLE TOY ASSEMBLY fabricated to be reversibly transformed to provide two different configurations using a single swinging operation. In one configuration, the toy presents a robot while in the other it presents an appearance similar to a fire truck.

U.S. Pat. No. 4,680,018 issued to Ohno sets forth a RECONFIGURABLE TOY ASSEMBLY constructed to be reversible transformed to provide a toy vehicle in one configuration and a robot-like type creature in an alternate configuration.

U.S. Pat. No. 4,580,993 issued to Ohno sets forth a RECONFIGURABLE TOY ASSEMBLY having a plurality of reversibly transformable components forming a pick-up truck in one configuration and a robot-like creature in an alternate configuration.

U.S. Pat. No. 4,750,895 issued to Shinohara et al. sets forth a RECONFIGURABLE TOY ASSEMBLY having a plurality of interconnected components capable of transforming between a fanciful spaceship in one configuration and a robot in an alternate configuration.

U.S. Pat. No. 4,382,347 issued to Murakami sets forth a TOY TRACTOR ASSEMBLY capable of being reconfigured through a time control action into an alternate configuration. During the transformation, projectiles may be fired and a miniaturized vehicle may be released and propelled from the toy assembly.

U.S. Pat. No. 4,710,146 issued to Rasmussen et al. and U.S. Pat. No. 4,689,034 issued to Dubois et al. set forth projectile launching toys generally related to the present invention.

While the foregoing described prior art devices have to some extent improved the art and have in some instances enjoyed commercial success, there remains nonetheless a continuing need in the art for evermore interesting, amusing and entertaining reconfigurable toys.

SUMMARY OF THE INVENTION

Accordingly, it is a general object of the present invention to provide an improved reconfigurable toy. It is a more particular object of the present invention to provide an improved reconfigurable toy which assumes the configuration of a cycle in one its alternate configurations.

In accordance with the present invention there is provided a reconfigurable toy cycle reconfigurable between a cycle configuration and a rocket launcher configuration said toy cycle comprising: a cycle frame having a seat frame and seat; a pair of trailing arms having a removably supported rear wheel coupled to the cycle frame; a front fork assembly pivotable between a first position and a second position, the front fork assembly including a pair of shock tubes each having a shock tube end; a front wheel having an axle and a pair of receptacle secured to the axle on opposed sides of the front wheel, the receptacles removably receiving the shock tube ends to removably secure the front wheel to the front fork assembly; a handle bar assembly having a neck, removably attachable to the front fork assembly and the frame, a handlebar and a pair of hand grips; and a pair of simulated rockets removably secureable to the trailing arms each defining a bore therein; the toy cycle being reconfigured from the cycle configuration to the rocket launcher configuration by removing the handlebar assembly from the front fork assembly, removing the receptacles from the shock tubes, pivoting the front fork assembly from the first position to the second position, attaching the handlebar assembly to the frame, removing the rear wheel, removing each of the simulated rockets from the trailing arms and positioning them upon the shock tubes.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a reconfigurable toy cycle constructed in accordance with the present invention assuming its cycle configuration.

FIG. 2 sets forth a partial perspective view of the reconfigurable toy cycle of FIG. 1 at an early stage of reconfiguration;

FIG. 3 sets forth a partial perspective rear view of the reconfigurable toy cycle of FIG. 1 showing a subsequent of reconfiguration;

FIG. 4 sets forth a front perspective view of a portion of the present invention reconfigurable toy cycle at a further stage of reconfiguration;

FIG. 5 sets forth a partial perspective view of a further step in the reconfiguration of the present invention reconfigurable toy cycle;

FIG. 6 sets forth a partially sectioned side view of the reconfiguration step shown in FIG. 5;

FIG. 7 sets forth a perspective view of a portion of the present invention reconfigurable toy cycle at an initial step at reassembling to its alternate configuration;

FIG. 8 sets forth a partial perspective assembly view of a further reconfiguration step of the present invention reconfigurable toy cycle;

FIG. 9 sets forth a partial section view of the projectile launching apparatus of the present invention reconfigurable toy cycle seen in FIG. 8;

FIG. 10 sets forth a perspective view of the projectile launcher of FIG. 10 in its fully loaded position;

FIG. 11 sets forth a perspective view of the present invention reconfigurable toy cycle in its alternate configuration which provides a projectile launching apparatus.

DESCRIPTION OF THE PREFERRED EMBODIMENT

FIG. 1 sets forth a perspective view of reconfigurable toy constructed in accordance with the present invention and generally referenced by numeral 10. Toy 10 is shown in FIG. 1 in its cycle configuration. The cycle configuration of toy 10 generally resembles a type of cycle often referred to as a "mountain bike" in that it provides a heavy duty appearance and resembles the rugged structure of cycles used in off-road or mountain biking activities. In addition, toy 10 is some what fanciful in its configuration and utilizes a play pattern in which the cycle is considered to be "rocket powered".

More specifically, toy 10 includes a frame 11 supporting a handlebar assembly 12 having a neck 13, a pair of hand grips 14 and 15 and a handlebar 16. Toy 10 further includes a front fork assembly generally referenced by numeral 20 and having a pair of spaced plates 77 and 78 which support a pair of downwardly extending shafts 80 and 81. A shock bracket 59 is supported upon shafts 80 and 81 in the manner set forth below. Bracket 59 in turn supports a pair of downwardly extending generally cylindrical shock tubes 21 and 22. Shock tubes 21 and 22 are received within a pair of receptacles 23 and 24. Receptacles 23 and 24 receive the lower ends of shock tubes 21 and 22. Receptacles 23 and 24 are further coupled to a front axle 25 which in turn rotatably supports a front wheel 26. A simulated front brake caliper 28 is supported upon bracket 59.

Frame 11 further supports a fork release 54 operative in the manner set forth below to allow pivoting movement of front fork assembly 20. A number plate 27 is supported upon plate 78 and an aperture 76 is formed in plate 77 to receive neck 13 and secure handlebar assembly 12. Frame further supports a seat frame 31 having a pivot 32 which in turn supports a seat 30. A pair of pedal cranks 51 and 53 are rotatably supported upon the lower end of frame 11 and include a simulated front sprocket 52. A simulated chain 55 is secured to sprocket 52 and extends rearwardly in a simulated chain drive manner. A pair of pivotally supported trailing arms 57 and 58 (trailing arm 57 seen in FIG. 3) are pivotally secured to the lower end of frame 11 by pivot 56 extending between crack arms 51 and 53.

Toy 10 further includes a rear wheel 40 rotatably supported at the end of trailing arms 57 and 58 (trailing arm 57 seen in FIG. 3) a pair of simulated rockets 41 and 42 are snap-fit attached to trailing arms 57 and 58.

In the configuration shown in FIG. 1, toy 10 is utilized in a play pattern typical of toy cycles as the user manipulates toy 10 in various play manners such as rolling up and down various obstacles or across various surfaces. Front wheel 26 and real wheel 40 are fully rotatable while the pivotal attachment at pivot 56 between frame 11 and trailing arms 57 and 58 (trailing arm 57 seen in FIG. 3) provide realistic articulation of the rear wheel support of toy 10. Toward this end, a spring 43 is coupled between seat frame 31 and trailing arms 57 and 58 to provide resilient flexing of rear wheel 40 in the directions indicated by arrows 48.

In accordance with an important aspect of the present invention, toy 10 is reconfigurable by disassembling certain portions of toy 10 and reassembling the portions in a different configuration. With temporary reference to FIG. 11, an alternate configuration of toy 10 is shown which provides a fanciful rocket launcher or missile launcher type of configuration toy. Returning to FIG. 1, it will be apparent in the descriptions which follow, the present invention toy utilizes a novel combination of removable components and subassemblies which may be reassembled to provide the alternate configuration of the toy in the manner described below.

FIG. 2 sets forth partial perspective view of the front portion of toy 10 showing the initial step of reconfiguration. By way of overview, the initial step of this reconfiguration in essence, involves removing front wheel 26 and receptacles 23 and 24 from the remainder of front fork assembly 20.

More specifically, toy 10 includes a frame 11 supporting a handlebar assembly 12 having a neck 13, a pair of hand grips 14 and 15 and a handlebar 16. Toy 10 further includes a front fork assembly generally referenced by numeral 20 and having a pair of spaced plates 77 and 78 which support a pair of downwardly extending shafts 80 and 81. A shock bracket 59 is supported upon shafts 80 and 81 in the manner set forth below. Bracket 59 in turn supports a pair of downwardly extending generally cylindrical shock tubes 21 and 22. Shock tubes 21 and 22 are received within a pair of receptacles 23 and 24. Receptacles 23 and 24 receive the lower ends of shock tubes 21 and 22. Receptacles 23 and 24 are further coupled to a front axle 25 which in turn rotatably supports a front wheel 26. A simulated front brake caliper 28 is supported upon bracket 59.

Frame 11 further supports a fork release 54 operative in the manner set forth below to allow pivoting movement of front fork assembly 20. A number plate 27 is supported upon plate 78 and an aperture 76 is formed in plate 77 to receive neck 13 and secure handlebar assembly 12.

The separation of receptacles 23 and 24 from ends 35 and 36 of shock tubes 21 and 22 is made possible by the attachment of ends 35 and 36 within bores 33 and 29 formed in receptacles 23 and 24. In the preferred fabrication of the present invention, the size of bores 33 and 29 is selected to provide a snug friction-fit upon ends 35 and 36. Thus, the user simply removes wheel 26 and receptacles 24 by forcing wheel 26 downwardly in the direction indicated by arrow 60 which in turn withdraws receptacle 23 and 24 from shock tubes 21 and 22 in the directions indicated by arrows 61 and 62. In this manner wheel 26 is removed.

FIG. 3 sets forth a partial rear perspective of toy 10 showing the next step of reconfiguration. Toy 10 includes a frame 11 supporting a fork release 54 and a seat frame 31. Seat frame 31 includes a pivot 32 supporting a seat 30. A pair of trailing arms 57 and 58 are pivotally secured to lower end of frame 11 at a pivot joint 56. A spring 43 is coupled between seat frame 31 and trailing arms 57 and 58. A crack arm 53 is rotatably supported at pivot 56. A pair of apertures 65 and 66 are formed in trailing arms 58 and 57 respectively. A rear wheel 40 includes a pair of axles 71 and 72 which normally fit within apertures 65 and 66 respectively to rotatably support rear wheel 40. At the stage of disassembly shown in FIG. 3, the user has flexed trailing arms 57 and 58 outwardly in the direction indicated by arrows 73 and 74 to remove axles 71 and 72 from apertures 65 and 66. As a result, rear wheel 40 is withdrawn in the direction indicated by arrow 75.

FIG. 4 sets forth a perspective view of toy 10 at the next stage of disassembly prior to reconfiguration. As described above, toy 10 includes a frame 11 supporting a seat frame 31 having a pivot 32 supporting a seat 30. Frame 11 further includes a pair of plates 77 and 78 defining an aperture 76. A number plate 27 is supported upon plates 77 and 78. Plates 77 and 78 further support a pair of downwardly extending shafts 80 and 81 which in turn supports a shock bracket 59. Shock bracket 59 supports a front caliper 28 and a pair of downwardly extending shock tubes 21 and 22. Shock tubes 21 and 22 define respective ends 35 and 36. A fork release 54 is supported on the underside of frame 11 and is operable in the manner described below in FIG. 6. Suffice it to note here, that release 54 latches front fork assembly 20 in either the cycle configuration shown in FIG. 1 or alternatively the missile launcher configuration shown in FIG. 11.

Frame 11 further supports a pivot 56 having pedal cracks 51 and 53 rotatably supported thereon. In addition, pivot 56 supports a pair of rearwardly extending trailing arms 57 and 58. As is better seen in FIG. 3, trailing arms 57 and 58 define respective apertures 66 and 65 for supporting rear wheel 40. Spring 43 is coupled between seat frame 31 and trailing arms 57 and 58.

Toy 10 further includes a neck 13 having a shaft 17 supporting a handlebar 16 and a pair of handle grips 14 and 15. The combination of neck 13, shaft 17, handlebar 16 and grips 14 and 15 form handlebar assembly 12.

Handlebar assembly 12 is removable from front fork assembly 20 by withdrawing shaft 17 from aperture 76 in plate 77. This withdrawal is carried forward by simply drawing hand grips 14 and 15 upwardly in the direction indicated by arrows 46 and 47. With handlebar assembly 12 removed, toy 10 is ready for the next stage of reconfiguration.

FIG. 5 sets forth a partial perspective view of the next step of reconfiguration of toy 10. Thus, frame 11 includes a pivot 85 supporting a flange 86 within a slot 79. A slot 87 is also formed in frame 11 which receives a downwardly extending lever 84. Lever 84 in turn supports fork release 54.

Flange 86 supports plates 77 and 78. Plates 77 and 78 in turn supports shafts 80 and 81 (seen in FIG. 2). Shafts 80 and 81 slidably support a shock bracket 59 which in turn supports a caliper 28. A number plate 27 is pivotally supported upon plates 77 and 78 in the manner set forth below in FIG. 9. Bracket 59 further supports a pair of shock tubes 21 and 22 which in turn define respective ends 35 and 36.

In the step of reconfiguration shown in FIG. 5, the latch operative upon flange 86 to maintain front fork assembly 20 in the cycle configuration shown in FIG. 1 has been released by moving latch release 54 in the direction indicated by arrow 83. By means better seen in FIG. 6, this allows flange 86 to pivot upwardly in the direction indicated by arrow 82. By means also better seen in FIG. 6, once flange 86 has pivoted upwardly, release 54 then acts to latch flange 86 in this alternate configuration.

FIG. 6 sets forth a partial section view of the fork assembly latch mechanism of toy 10. Toy 10 includes a frame 11 having an interior cavity 90 and defining an upper slot 79 and a lower slot 87. A pivot 85 pivotally secures flange 86 to frame 11. Flange 86 extends through slot 79 which is sufficient in length to allow pivotal movement of flange 86 upwardly in the direction indicated by arrow 86. Flange 86 further defines a pair of notches 92 and 93.

A lever 84 having a forwardly extending latch tab 91 is movable within slot 87. A spring 115 is coupled to lever 84 to urge lever 84 forwardly toward its latching position as shown in FIG. 6. Fork release 54 is supported upon the lower end of lever 87 and is used to move lever 87 to unlatch fork assembly 20. As described above, flange 86 supports plates 77 and 78 which in turn support downwardly extending shafts 80 and 81 (shaft 80 seen in FIG. 1).

In operation the alternate position of fork assembly 20 shown in FIG. 5, is obtained by initially moving fork release 54 in the direction indicated by arrow 64 against the force of spring 115. This movement withdraws tab 91 from notch 92 and freeze flange 86 for pivotal movement about pivot 85 upwardly in the direction indicated by arrow 86. Once flange 86 has pivoted to the raised position shown in FIG. 5, notch 93 of flange 86 is positioned in alignment with tab 91. Thereafter, releasing fork release 54 allows spring 115 to position tab 91 within notch 93 thereby securing the alternate position of fork assembly 20 shown in FIG. 5.

FIG. 7 sets forth a perspective view of toy 10 at the initial stages of reassembling and reconfiguring toy 10 into the missile launcher configuration shown in FIG. 11. As described above, toy 10 includes a frame 11 supporting a seat frame 31 which includes a pivot 32 supporting a seat 30. Seat 30 further supports a lever 97. Seat 30 is shown pivoted in the direction indicated by arrow 37 revealing lever 97.

Frame 11 further includes a pivot 85 supporting a flange 86 within a slot 79. Flange 86 supports front fork assembly 20 at plates 77 and 78. Plates 77 and 78 support a number plate 27. A pair of shafts 80 and 81 (shaft 80 seen in FIG. 1) are supported by plates 77 and 78 and sliding supports a bracket 59. Bracket 59 in turn supports a caliper 28 and a pair of shock tubes 21 and 22. Shock tubes 21 and 22 defines respective ends 35 and 36. A lever 84 extends through slot 87 and supports fork release 54.

A pivot 56 at the lower end of frame 11 supports pedal cranks 51 and 53 together with a rearwardly extending chain and a pair of trailing arms 57 and 58 (trailing arm 57 seen in FIG. 3). Frame 11 further defines a bore 95 at the lower end thereof. A spring 43 is coupled between seat frame 31 and trailing arms 57 and 58.

A handlebar assembly 12 having a shaft 17, a neck 13, a handlebar 16 and a pair of hand grips 14 and 15 is assembled to the lower end to frame 11 by insertion of shaft 17 into bore 95 as indicated by arrow 96. As a result of this assembly, handlebar assembly 12 provides a support for the lower end of frame 11.

FIG. 8 sets forth a perspective view of front fork assembly 20 being loaded with simulated rockets 41 and 42. As is better seen in FIG. 9, simulated rocket 41 defines a bore 44 which allows rocket 41 to be loaded upon shock tube 22. While not seen in FIG. 8, it will be understood that simulated rocket 42 is identical to simulated rocket 41 and thus defines an internal bore allowing it to be loaded upon shock tube 21.

More specifically, toy 10 includes a frame 11 supporting a fork release 54 and a pivot 85. Pivot 85 supports a flange 86 which in turn supports a shock bracket 59. Shock bracket 59 supports a pair of shock tubes 21 and 22 as well as a caliper 28. A pair of shafts 80 and 81 are receivable within shock tubes 21 and 22 in the manner seen in FIG. 9. Shafts 80 and 81 are supported by a pair of plates 77 and 78 which in turn supports a number plate 27 having a tooth 107 formed at the frontal edge thereof. Shock bracket 59 further defines a lip 99. A pair of simulated rockets 41 and 42 are slidably positioned upon shock tubes 21 and 22 by moving in the direction indicated by arrows 111 and 112. Once simulated rockets 41 and 42 are positioned upon shock tubes 21 and 22, shock bracket 59 is moved in the direction indicated by arrow 110 upon shafts 80 and 81 until tooth 107 of number plate 27 engages lip 99 as seen in FIG. 9. The spring loaded mechanism operative upon shock bracket 59 and shock tubes 21 and 22 is illustrated in FIG. 9. It will be noted, that the structure of shaft 81 and shock tube 22 shown in FIG. 9 is repeated in the structure of shaft 80 within shock tube 21. Thus, both shock tubes 21 and 22 include an identical spring illustrated as spring 89 in FIG. 9.

FIG. 9 sets forth a partial section view illustrating the cooperation of simulated rocket 41 and the projectile launching mechanism provided by front fork assembly 20. Shock bracket 59 supports shock tube 22 between which an internal bore 67 is formed. Bracket 59 defines a lip 102 which captivates a piston end 88 of shaft 81. Spring 89 captive within bore 67 urges piston end 88 of shaft 81 toward the extended position shown in FIG. 9. Bracket 59 supports a plate 98 having a lip 99 formed therein together with a caliper 28. A simulated rocket 41 defining an internal bore 44 is loaded upon shock tube 22 as shown.

Front fork assembly 20 includes a pair of plates 77 and 78 supporting shafts 80 and 81 (shaft 80 seen in FIG. 8). Plate 77 and 78 further support number plate 27 at a pivot 105. A spring 107 is coupled between plate 78 and number plate 27 to urge plate 27 toward rotation in the direction indicated by arrow 106. Plate 27 defines a tooth 107.

In operation, and with simulated rockets 41 and 42 installed upon shock tubes 22 and 21 respectively in the manner shown in FIG. 8, the combined assembly of bracket 59 and shock tubes 21 and 22 together with simulated rockets 41 and 42 is moved toward number plate 27 in the direction indicated by arrow 100 against the force of spring 89 and the corresponding spring within shock tube 21 (not shown). This movement stores energy within spring 89 and the corresponding spring within shock tube 21. Once bracket 59 has moved to the dash-line position shown in FIG. 9, tooth 107 of number plate 27 engages lip 99 in the dash-line position shown. Thus, number plate 27 provides a restraining latch maintaining the pre-launch position of bracket 59 against the force of spring 89 and the corresponding spring in shock tube 21 (not shown).

The projectile launcher thus formed is released by the user simply pivoting number plate 27 in the direction indicated by arrow 101. This pivotal movement removes tooth 107 from lip 99 allowing bracket 59 to move in the direction indicated by arrow 20 in a rapid movement. This rapid movement is abruptly stopped by the action of piston end 88 against lip 102 of bracket 59. Once bracket 59 and shock tubes 21 and 22 are abruptly stopped, simulated rockets 41 and 42 are thrust forwardly in the direction indicated by arrow 120.

FIG. 10 sets forth a perspective view of the missile launcher described in FIGS. 8 and 9 in a fully loaded position in preparation for launch. In this launched condition, rockets 41 and 42 are supported upon shock tubes 21 and 22 (seen in FIG. 8) in the manner described in FIG. 9.

More specifically, toy 10 includes a frame 11 supporting a fork release 54 and a pivot 85. Pivot 85 supports a flange 86 which in turn supports a shock bracket 59. Shock bracket 59 supports a pair of shock tubes 21 and 22 as well as a caliper 28. A pair of shafts 80 and 81 are receivable within shock tubes 21 and 22 in the manner seen in FIG. 9. Shafts 80 and 81 are supported by a pair of plates 77 and 78 which in turn supports a number plate 27 having a tooth 107 formed at the frontal edge thereof. Shock bracket 59 further defines a lip 99.

In the loaded position shown in FIG. 10, and as is described above in FIG. 9, the user launches rockets 41 and 42 by simply pressing number plate 27. Number plate 27 then pivots in the manner shown in FIG. 9 to withdrawal tooth 107 from lip 99 releasing bracket 59.

FIG. 11 sets forth a perspective view of toy 10 in its alternate configuration. As described above, toy 10 includes a frame 11 supporting a seat frame 31 having a seat 30 pivotally secured thereto by a pivot 32. Seat 30 further supports a lever 97. Frame 11 further supports a handlebar assembly 12 by the insertion of shaft 17 of neck 13 (seen in FIG. 7) into aperture 95. The remainder of handlebar assembly 12 including handlebar 16 and grips 14 and 15 provides support for frame 11. Frame 11 further supports a pair of trailing arms 57 and 58 (trailing arm 57 seen in FIG. 4) together with a pair of pedal cranks 51 and 53. A spring 43 is coupled between trailing arms 57 and 58 (trailing arm 57 seen in FIG. 4).

Frame 11 further defines a slot 79 within which a flange 86 is pivotally secured by a pivot 85. Flange 86 supports a caliper 28 and a pair of to-be-launched simulated rockets 41 and 42. Flange 86 supports a pair of plates 77 and 78 which support a number plate 27.

In the alternate configuration of FIG. 11, toy 10 now assumes the fanciful configuration of a rocket or missile launcher which is actually able to launch a pair of simulated rockets. The reconfiguration of toy 10 back into the cycle configuration of FIG. 1 is carried forward by initially reversing the above described configuration process.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A reconfigurable toy cycle reconfigurable between a cycle configuration and a rocket launcher configuration said toy cycle comprising:

a cycle frame having a seat frame and seat;

a pair of trailing arms having a removably supported rear wheel coupled to said cycle frame;

a front fork assembly pivotable between a first position and a second position, said front fork assembly including a pair of shock tubes each having a shock tube end;

a front wheel having an axle and a pair of receptacles secured to said axle on opposed sides of said front wheel, said receptacles removably receiving said shock tube ends to removably secure said front wheel to said front fork assembly;

a handle bar assembly having a neck, removably attachable to said front fork assembly and said frame, a handle bar and a pair of hand grips; and a pair of simulated rockets removably secureable to said trailing arms each defining a bore therein;

said toy cycle being reconfigured from said cycle configuration to said rocket launcher configuration by removing said handlebar assembly from said front fork assembly, removing said receptacles from said shock tubes, pivoting said front fork assembly from said first position to said second position, attaching said handlebar assembly to said frame, removing said rear wheel, removing each of said simulated rockets from said trailing arms and positioning them upon said shock tubes.

2. The reconfigurable toy cycle set forth in claim 1 wherein said front fork assembly defines a first aperture and said neck having a shaft being insertable into said first aperture in said cycle configuration and wherein said frame defines a second aperture and said shaft being inserted into said second aperture in said rocket launcher configuration.

3. The reconfigurable toy cycle set forth in claim 2 wherein said front fork assembly includes a spring-driven launcher coupled to said shock tubes for launching said pair of simulated rockets from said shock tubes.

* * * * *